July 21, 1925. 1,547,064
G. H. NOBBS
TOOL ATTACHMENT FOR TRACTORS
Filed Oct. 25, 1921 3 Sheets-Sheet 1

INVENTOR
George H. Nobbs
By Mitchell, Chadwick & Kent,
ATTORNEYS

July 21, 1925.
G. H. NOBBS
1,547,064
TOOL ATTACHMENT FOR TRACTORS
Filed Oct. 25, 1921 3 Sheets-Sheet 2
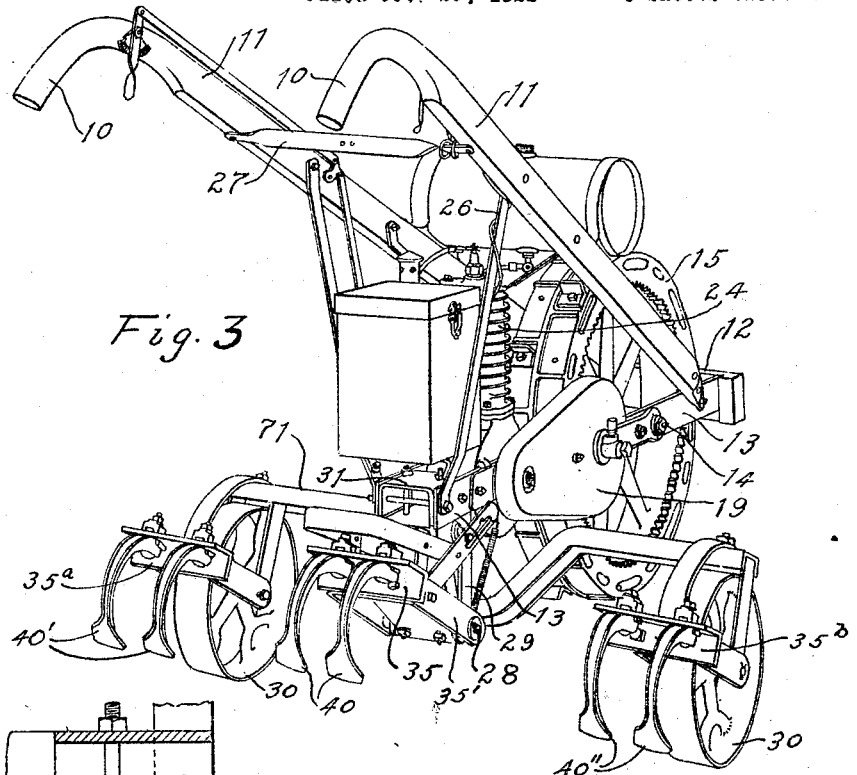
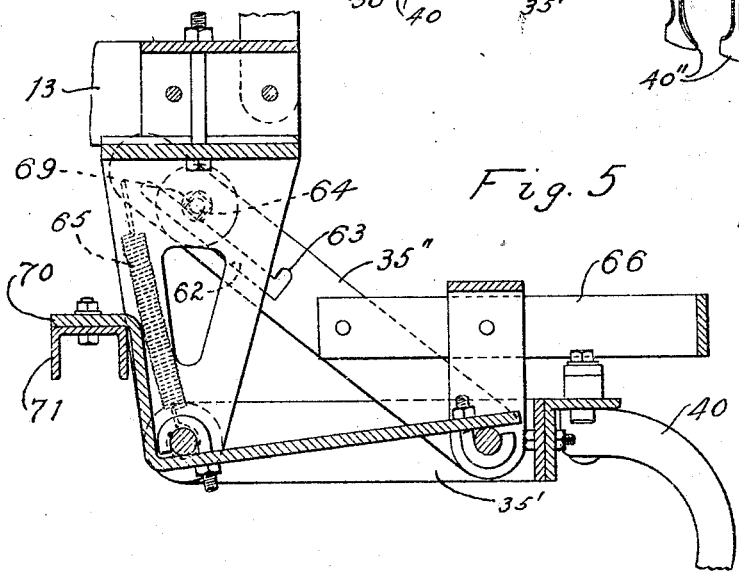
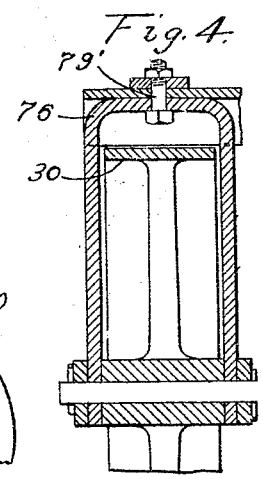
INVENTOR
George H. Nobbs
By Mitchell, Chadwick & Kent
ATTORNEYS

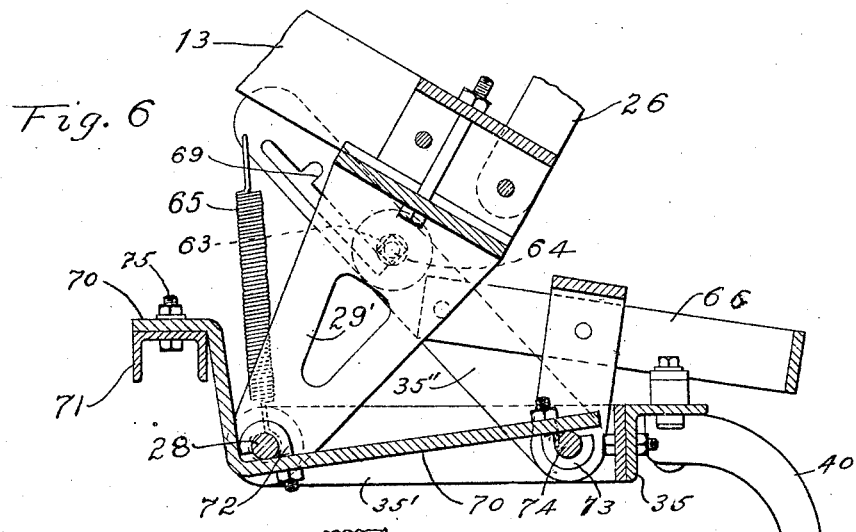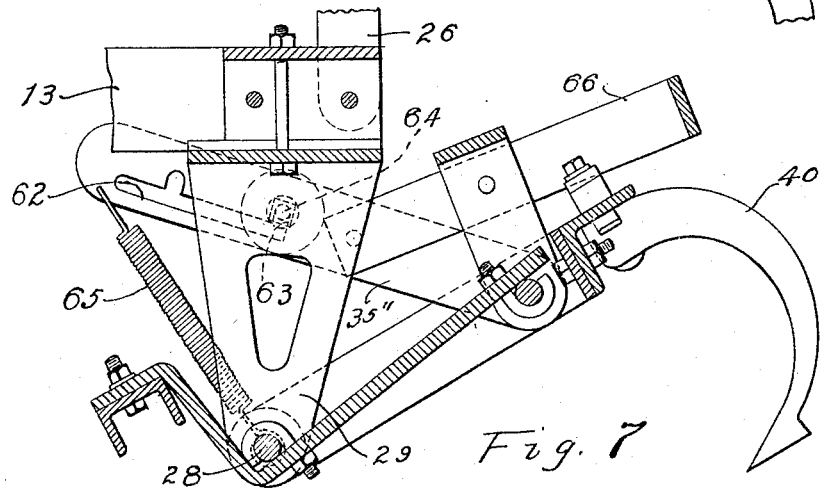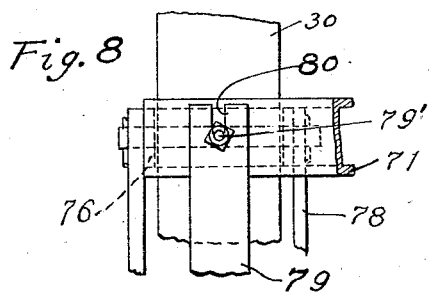

Patented July 21, 1925.

1,547,064

UNITED STATES PATENT OFFICE.

GEORGE H. NOBBS, OF WATERTOWN, MASSACHUSETTS.

TOOL ATTACHMENT FOR TRACTORS.

Application filed October 25, 1921. Serial No. 510,270.

*To all whom it may concern:*

Be it known that I, GEORGE H. NOBBS, a citizen of the United States, residing at Watertown, in the county of Middlesex and State of Massachusetts, have invented certain new and useful Improvements in Tool Attachments for Tractors, of which the following is a specification.

This invention relates to improvements in attachments for tractors. More particularly it relates to tractors of the type known as garden tractors, and especially to the type shown in my Letters Patent of the United States No. 1,366,019 of January 18, 1921, in which a forward traction wheel is associated with the frame which carries an engine and has rear guiding handles for use of an operator walking behind. In the machine illustrated in my said Letters Patent the rear runs on a tandem wheel which serves as a fulcrum about which the whole frame swings as a lever to lift the forward traction wheel from the ground and thus to stop the traction when the operator depresses the handles at the rear. It is an especial feature of the apparatus shown in said patent that this action can be accomplished without disturbing the tool, such as a cultivator, which is being drawn at the rear. In consequence the operator can stop the traction at any instant by depressing the handles, without having to stop the engine or to thrust the tool further into the ground or withdraw it from the ground. The tool holding mechanism there illustrated is a draw bar attached indirectly to the axle of said tandem fulcrum wheel; and the whole apparatus is adapted to operate in the narrow space between two rows of growing crops.

The present invention has among its objects the provision of apparatus by which the said traction stopping means and tool connection can be employed, and yet with a single forward traction wheel tools can be drawn at the rear capable of working in the spaces between four rows of growing crops simultaneously. And whereas in my said patent a strictly tandem arrangement of supporting wheels was shown, it is the object of the present invention to provide an attachment by which the apparatus has a distinctly triangular base having broad stability and embodying many features which characterize my said tandem type. It is another object of the invention to make apparatus which is convertible between the tandem or bicycle and the triangular or tricycle type by the mere substitution of attachments at the rear of the frame. It is also the object of the invention to provide the other advantages, some of which are mentioned hereinafter, which characterize the apparatus herein disclosed. The invention may be embodied in various forms, of which the style herein shown is illustrative. It is intended that the patent shall cover by suitable expression in the appended claims whatever features of patentable novelty exist in the invention disclosed.

In the accompanying drawings:

Figure 3 is a perspective view from the right rear showing the entire tractor, with the attachment in place and with the tool raised from the ground;

Figure 4 is a rear elevation of a detail, on an enlarged scale, being a medial section in the plane of the yoke over one of the rear wheels;

Figure 2:
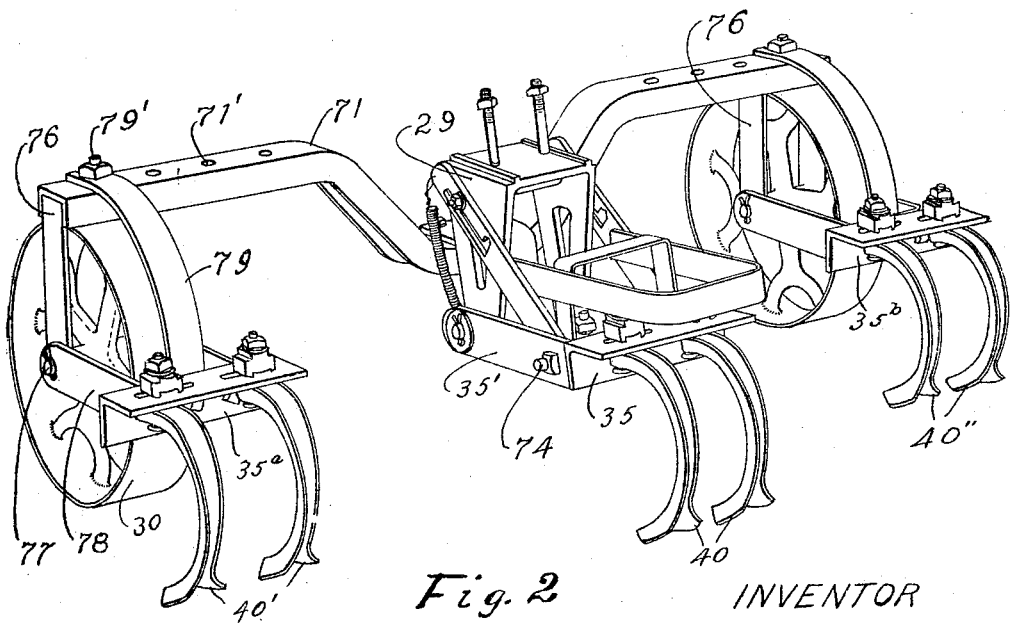
Figure 2 is a view of the same, in the same position, with a portion of the rear of the tractor to which it is in this figure represented as being attached.

Figures 5, 6 and 7 are side elevations, in section on the medial fore and aft plane of the machine, being through the part of the machine and attachment which are in the middle of Figure 2, showing on an enlarged scale different positions of the tool control mechanism of the tractor and of the attachment thereto, Figure 5 showing the same in operating position as when the tool is working in the ground, Figure 6 the same when the tractor is tipped as by the operator depressing the handles, with the tool still remaining in the ground, and Figure 7 showing the position when the machine has been returned to horizontal, and the attachment has thereby lifted the tool from the ground; and Figure 8 is a plan view of the detail seen in Figure 4, being one of the rear wheels with its associated parts.

Referring to the drawings, and particularly to Figure 3, the apparatus illustrated has a frame with handles 10 arranged at such an elevation and spread as is convenient for an operator. From these, main fore and aft bars 11 converge forward and downward to the front of the machine where they join horizontal fore and aft bars 13, which are spaced apart by a forward cross bar 12, the bars 13 holding the ends of the axle 14 of the traction wheel 15. The latter is driven by an engine 24 through the medium of suitable gearing within a case 19. Rear upright and cross bars are marked 26 and 27, and the frame is completed by parts at the rear end of the lower side bars 13, comprising a spreader yoke 29 below, extending downward, and by a channel iron filler and spreader 31 between them. The yoke 29 reaches down so as to support the ends of an axle 28 at a proper distance from the ground for the tandem rear wheel 30 of my said Letters Patent, which is of the same size as the two rear wheels 30 of the present drawings.

The present invention relates to an attachment which is made to this axle and its associated parts, the wheel which is shown on that axle in my above mentioned Letters Patent being removed. The other adjacent parts, being the tool controlling apparatus, comprising the yoke 35' extending to the rear to draw bar 35, remain in place; as do also the side tie bars or links 35'' with the auxiliary lever 66 by which an operator manipulates the latch 62, 63, 64 of the rear yoke. The springs 65 also continue in use. The action of these parts is that when the tool is to be lifted from the ground, the traction wheel being on the ground as shown in Figure 3, the tool 40 is lifted from the ground, and is held there, latched up, as shown in Figures 3 and 7, by engagement of pin 64 in notch 63; but when the operator by depressing lever 66 lifts the side tie bar 35'' he unlatches this engagement so that the pin 64 can slide along in slot 62, the tool 40 meanwhile descending until it strikes the ground at which time it may occupy a position such as is shown in Figure 5. The horizontal direction of the side bar 13 in Figures 5 and 7 indicates that the traction wheel is on the ground. To lift the tool from the position of Figure 5 to that of Figures 7 and 3 the operator depresses the handles 10 of Figure 3, thereby swinging the yoke 29 and frame 13, 12, 11, around the axle 28, while the tool remains in the ground, until the spring 65 causes the notch 63 to close down around the pin 64 as shown in Figure 6. Then, the operator letting the frame swing back to horizontality, the tie bar 35'' pulls the draw bar yoke 35' with the draw bar 35 and tool 40 up from the ground, the whole swinging around the axle 28 to the position of Figures 7 and 3.

The attachment of the present invention provides additional tools 40' at the left and 40'' at the right of Figure 2, to work in adjacent rows, one at each side of the row in which the tool 40 works. In the present instance two tools at each location, 40', 40 and 40'', are shown; and it will be understood that the central draw bar 35 and the side draw bars 35ª and 35ᵇ are arranged, by methods well known, so as to hold any of a wide variety of tools either single or multiple.

It is one feature of the invention to provide means for operating all of these draw bars and the tools together to and from the ground, and to draw them together when in the ground. Other features are to have these tools capable of being set at varying distances apart at the will of the operator, to have them secure in their mountings, considering the severe stresses which each is liable to encounter at times, and to have apparatus strong enough, transmitting the traction outboard from the center to the necessary distance; and to provide for the ready attachment or detachment of the appliance.

Figure 1:
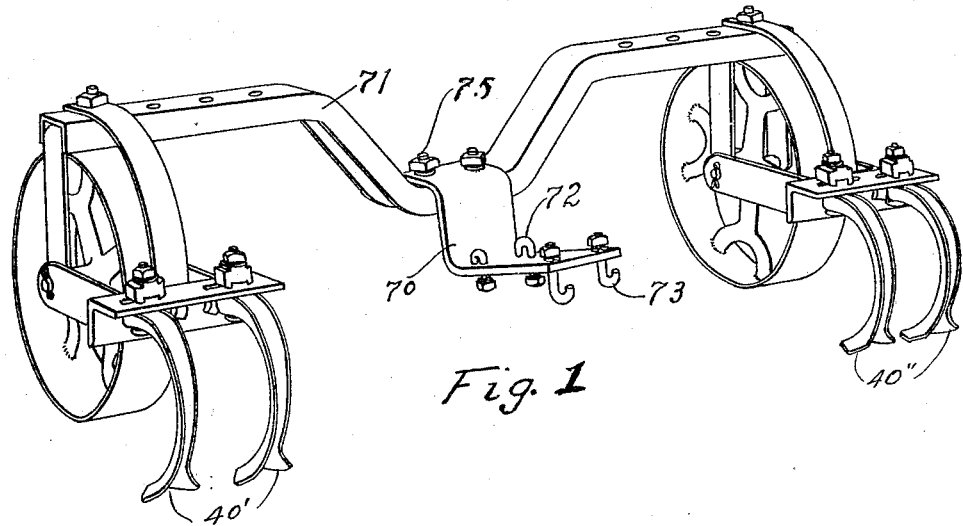
Figure 1 is a perspective view of the attachment, seen from the left rear, with the tool down.

The method of attachment is best seen in Figures 1 and 6. A bracket 70 is provided by which a transverse tool-and-wheel-carrying beam 71 is hung in such manner as to swing around the axle 28 with the yoke 35' and rear draw-bar 35. This beam extends laterally far enough, and at an elevation high enough, to reach beyond the two plant rows between which the traction wheel 15 is being driven. If desired the beam may reach further, as for example to beyond the second plant row on each side; but only the distance first mentioned is shown, that being sufficient to illustrate this feature of the invention.

It is a feature of the invention that this beam serves for both tools and wheels and in addition to constituting a fulcrum about which the traction wheel can be swung upward, in the fore and aft plane to stop the traction, by the operator's depressing of the handles 10, serve also to help keep the apparatus headed straight. This is because sidewise pulls tending to make the apparatus veer, would result from the varying soil conditions in which the oppositely out rigged tools often find themselves. A softness of soil, suddenly encountered on one flank, for example, would lead the tool on that side to run down in more deeply. This would tip the whole, and the deeper tool would tend to drag more heavily than the other, and call for sudden resistance by the operator. But the fact that a broad wheel is associated with such a tool, close in front of that tool, intimately attached thereto through the beam, and running on the surface of the ground, prevents the tool from running down, and so prevents the otherwise to be expected disturbance of the steering. The broadness at which the wheels are set, when operating with three or four rows of crops between them produces an average operating level for the tools as a whole which tends to be uniform and steady. The three furrow cultivator is materially heavier than a single furrow cultivator, because of the additional tools and connections thereof; but because of those same tools and connections the two additional furrows may be handled with even greater ease than the single furrow. The bracket 70 holds the beam 71 and the axles of the wheels 30, which constitute the fulcrum, a little forward of the axle 28, which, without the attachment, is the axis of the rear fulcrum wheels. Hence the forward traction wheel and engine are more easily lifted by the depressing of the handles at the rear than when the apparatus described is used with a single furrow for the leverage is more favorable. On this swing the attachment to the three tools is automatically made, and the three tools rise from the ground on the opposite swing for the engine and other parts forward of the fulcrum are enough to lift them without effort on the part of the operator. On the other hand, when the tools are down in the ground, and are latched down by the engagement of notch 69 as seen in Figure 5, the weight of all of the tools is added to the weight of the other parts of the apparatus to hold each tool down at its predetermined desired level below the surface. This makes possible the use of lighter tools, and so perfects the device of the invention as a light machine which can be operated by one man over several furrows at once. The various parts of the machine are thus by the invention used to supplement the strength of the man in manipulating certain particular parts which require manipulation. The described breadth of apparatus makes it possible, moreover, to work in even narrower furrows than when the machine operates only in one furrow, for in that case the wheels 30 are mounted on the axle 28, and must run in the furrow; but with the three furrow attachment they can run in the furrow at each side, leaving only the tool to run in the central furrow behind the narrow traction wheel 15. Because of this separation of the wheels, each into a separate furrow, each wheel can conveniently have a broader face than where both wheels have to run in the same furrow. In consequence the same tractor requires less power per furrow to drive it, when fitted with the attachment herein described and operating in three furrows, than when operating with a single tool in a single furrow. This is doubtless because the broader wheels do not sink so deeply.

The specific construction herein illustrated for out rigging the wheels and tools on the beam 71 of the tractor, will now be described. The bracket 70 is a forward extension of the rear tool yoke 35′ which has hitherto been provided as a part of the machine for working in a single furrow. It is a zigzag plate equipped with a pair of pivot hooks 72 that reach up from its middle and engage around the shaft 28, which serves as the axle when the rear wheel or wheels are set tandem with the traction wheel 15. At this joint there is possibility of motion of the yoke 35′ and bracket 70 with respect to the depending yoke and the main frame of the machine. From this the plate runs backward and upward within the yoke to above the rear horizontal bolt 74, where it has a pair of yoke hooks 73 that reach down and engage around the bolt 74 as a convenient means of engaging the rear end of the yoke 35′. Forward of the shaft 28 it extends upward and then a few inches slightly forward for an attachment to the laterally extending channel iron beam 71, conveniently by bolts 75 passing down into its inverted channel from its central portion, to which the attachment last mentioned is made, the beam extends obliquely upward toward each side of the apparatus to a suitable elevation to clear whatever height of growth of growing crops it is desired the apparatus shall clear between furrows. At such desired elevation it extends laterally as far as may be designed to reach over one or more lateral rows of growing plants to the furrow beyond, having at frequent intervals holes through its middle web for the attachment of one or more sub-yokes on each flank of the machine, in either of a number of positions in which it may be desired to attach them. There is a sub-yoke 76 for each wheel 30, facing fore and aft of the machine and carrying the axle 77 of the wheel 30. A tool yoke 78 extends horizontally to the rear from the same axle 77, far enough to clear the wheel 30, and there carries a draw-bar 35ª, and 35ᵇ, adapted to hold tools 40′, 40″. Each tool yoke 78 is sustained in its horizontal position by a strap 79 which rises in a quadrant curve from the middle of the tool yoke 78 to the beam 71 over the top of the sub-yoke 76, where its end is cleft with a slot 80 wide enough to receive a single bolt 79′ to hold together the sub-yoke 76, the quadrant strap 79 and the beam 71, thus securing in place the wheel 30 and the tool yoke 78 with any tools which it may happen to carry, so that all can swing together around the axis of the wheels 30. Inasmuch as the yoke 76 is made of strap iron of suitable width to fit into the channel of the beam 71, as clearly seen in each of Figures 1, 2 and 3, the yoke 76 cannot twist about the bolt 79; and therefore the wheels 30 are held with their axles rigidly fixed parallel to the beam 71, which in turn is held rigidly perpendicular to the line of travel of the machine by the pairs of attaching bolts 73 and 72.

It is one feature of the invention that each wheel can be quickly adjusted into another of the holes 71'. This is accomplished by the device seen in Figures 4 and 8, by providing the open ended slot 80 in the top end of the quadrant strap 79. Upon removing the nut of bolt 79' the quadrant strap 79 will slip out, owing to this open ended slot 80; and the bolt 79' will settle down so that its head is upon the wheel 30 (Figure 4). The length of this bolt is such that the bolt remains in the sub-yoke 76. It is only necessary then to shift the sub-yoke with wheel and tools, to whatever one of the holes 71' is desired, and, then thrusting the bolt up through it, to replace the quadrant strap 79 and the nut.

It will be understood that although a simple form of tool is illustrated such as may be most commonly employed, other tools may be substituted and that even mechanism such for example as is employed in a seeder may be substituted this being for the purposes herein regarded as a ground working tool. In such a case suitable power to operate the seeder would be derived from the rotation of the supporting wheels in the customary manner.

I claim—

1. An attachment for a tractor having a single traction and supporting wheel and tandem axis for another support, said attachment comprising a bar secured to the tractor approximately at said axis, rising thence and extending laterally and combined with wheels having axes substantially in line with the said tandem axis supporting its outer parts, and holders for ground tools associated therewith.

2. An attachment for a tractor having rear handles a single traction and supporting wheel and tandem axis for another support, said attachment comprising a bar secured to the tractor approximately at said axis, extending laterally and combined with wheels and holders for ground tools at its extremities; there being also a tool holder associated with the said tandem axis; a trip device for its raising and lowering with respect to the handles; and a connection therefrom to said bar, whereby the single trip operates all of the tools.

3. An attachment for a tractor having a single traction and supporting wheel and tandem axis for another support, said attachment comprising a bar secured to the tractor approximately at said axis, rising thence and extending laterally from the tandem line, and being maintained perpendicular thereto; yokes extending down from the outer portions thereof; axles and wheels in said yokes; and holders for ground tools associated with said bar.

4. An attachment for a tractor having a single traction and supporting wheel and tandem axis for another support, said attachment comprising a bar secured to the tractor approximately at said axis, rising thence and extending laterally; yokes extending down from the outer portions thereof, the said bar and yokes being adapted for the yokes to be set at any of a multiplicity of positions along the bar; axles and wheels in said yokes; and holders for ground tools associated with said bar.

5. An attachment for a tractor having a single traction and supporting wheel and tandem axis for another support, said attachment comprising a bar of channel form in cross section secured to the tractor approximately at said axis, rising thence and extending laterally from the tandem line maintained perpendicular thereto and combined with wheel holding means adapted to engage in the channel and holders for ground tools associated with the bar.

6. An attachment for a tractor having a single traction and supporting wheel and tandem axis for another support, said attachment comprising a channel bar secured to the tractor approximately at said axis, rising thence and extending laterally from the tandem line, and being maintained perpendicular thereto; combined with yokes within the channel, projecting thence downward; axles and wheels thereon; and means for holding ground tools.

7. An attachment for a tractor having a single traction and supporting wheel and tandem for another support, said attachment comprising a channel bar secured to the tractor approximately at said axis, rising thence and extending laterally; combined with yokes within the channel, projecting thence downward, axles and wheels thereon; and a tool holder with horizontal yoke to the wheel axle and curved strap to the bar above the wheel axle.

8. An attachment for a tractor having a laterally extending channel bar whose channel opens downward, comprising a wheel holding yoke adapted to fit movably within the channel; there being a series of holes provided along the channel, and a bolt for securing each yoke at a hole; and wheels, each held in a yoke with its periphery close to the said bar; said bolts being head down and of such length that when released and settled to the top of the wheel its other end is below the bar but not below the yoke, whereby the yoke and wheel can be shifted to a different hole without escape of the bolt.

9. An attachment for a tractor having rear handles a single traction and supporting wheel, a tandem axis for another support and a support for a tool holder at said axis; said attachment comprising a bar secured to the tool holder support, extending laterally, and having tool holders and wheels in its outer parts; there being means for the first mentioned tool support to be raised and lowered, with respect to the handles and a latch for said means; whereby a single control is afforded for all the tool holders on said bar.

10. An attachment for a tractor having a single traction and supporting wheel and a horizontal tandem axis for another support with a tool holder associated therewith adapted to swing about said axis, said attachment comprising a bracket secured to said swinging tool holder and swinging therewith, combined with a laterally extending bar secured to said bracket and swinging therewith and adapted to hold wheels and tools.

11. An attachment for a tractor having a single traction and supporting wheel and tandem axis for another support with swinging tool holder associated therewith, said attachment comprising a bracket combined with a laterally extending bar for holding wheels and tools, the said bracket having hooks engaging over and under separated cross bars of said swinging tool holder and said bracket extending forward thereof for its attachment to said bar.

12. An attachment for a tractor having a single traction and supporting wheel and tandem axis for another support, adapted to run between two rows in a garden, comprising a bar maintained perpendicular to the tandem line, rising within the space between said rows and extending laterally at an elevation giving plant clearance and having wheels and tool holders adapted to run between adjacent rows.

13. The combination with a tractor having a single traction wheel and a rear tool holding yoke, pivoted for moving a tool up and down, of a bracket extending from said yoke laterally from the tandem line being maintained perpendicular thereto at an elevation giving plant clearance and adapted to hold tools between rows adjacent to those between which the traction wheel runs.

14. The combination with a tractor, having a frame with single traction wheel, tandem, support and handles extending to the rear the whole being adapted to act as a lever for lifting the traction wheel about said handle support as a fulcrum, of an attachment adapted to replace the tandem support comprising a laterally extending bar having an elevation giving plant clearance and adapted to hold tools and supporting wheels in the space between adjacent rows at each side and approximately on the laterally extended axis of the replaced fulcrum, there being a latch between the frame and the tool holding device whereby the weight of the tractor on the other side of the fulcrum which is constituted by said supporting wheels may be utilized to lift the multiple tool set.

15. The combination with a tractor, having a frame with single traction wheel, tandem, support and handles extending to the rear the whole being adapted to act as a lever for lifting the traction wheel about said handle support as a fulcrum, of an attachment adapted to replace the tandem support comprising a laterally extending bar having an elevation giving plant clearance and adapted to hold tools and supporting wheels in the space between adjacent rows at each side and approximately on the laterally extended axis of the replaced fulcrum, there being a latch between the tool holder and the tractor frame whereby the weight of the tool holder and tools is supplemented by weight of the tractor for holding the tools in the ground.

Signed at Boston, Massachusetts, this third day of February, 1921.

GEORGE H. NOBBS.